United States Patent
Overskeid et al.

(10) Patent No.: US 11,261,989 B2
(45) Date of Patent: Mar. 1, 2022

(54) VALVE NOZZLE AND VALVE NOZZLE ASSEMBLY

(71) Applicant: Kilter AS, Langhus (NO)

(72) Inventors: Øyvind Overskeid, Langhus (NO); Anders Brevik, Langhus (NO); Jan Kåre Vatne, Langhus (NO); Frode Urdal, Langhus (NO); Trygve Utstumo, Langhus (NO)

(73) Assignee: KILTER AS, Langhus (NO)

( * ) Notice: Subject to any disclaimer, the term of this patent is extended or adjusted under 35 U.S.C. 154(b) by 152 days.

(21) Appl. No.: 16/093,165

(22) PCT Filed: Apr. 7, 2017

(86) PCT No.: PCT/NO2017/050086
§ 371 (c)(1),
(2) Date: Oct. 12, 2018

(87) PCT Pub. No.: WO2017/179991
PCT Pub. Date: Oct. 19, 2017

(65) Prior Publication Data
US 2019/0128440 A1    May 2, 2019

(30) Foreign Application Priority Data
Apr. 13, 2016    (NO) .................................. 20160612

(51) Int. Cl.
*F16K 31/08*    (2006.01)
*B05B 1/14*     (2006.01)
*B05B 1/30*     (2006.01)

(52) U.S. Cl.
CPC .............. *F16K 31/082* (2013.01); *B05B 1/14* (2013.01); *B05B 1/3053* (2013.01)

(58) Field of Classification Search
CPC ..................................................... F16K 31/083
See application file for complete search history.

(56) References Cited

U.S. PATENT DOCUMENTS 4,392,632 A * 7/1983 Gast ...................... F16K 31/082
                                                            251/129.1
6,626,612 B2    9/2003 Knapp
(Continued)

FOREIGN PATENT DOCUMENTS

CN       101130306 A       2/2008
DE     202005005619 U1     2/2006
(Continued)

OTHER PUBLICATIONS

International Search Report issued by the European Patent Office acting as the International Searching Authority in relation to International Application No. PCT/NO2017/050086 dated Sep. 19, 2017 (4 pages).

(Continued)

*Primary Examiner* — Michael R Reid
(74) *Attorney, Agent, or Firm* — Robert P. Michal, Esq.; Carter, DeLuca & Farrell LLP (57) ABSTRACT

A valve nozzle assembly including a number of valve nozzles arranged in a predetermined pattern. Each valve nozzle may include at least one coil; and a magnet adapted to be movable between a closed position closing the nozzle and an open position opening the nozzle, wherein a movement of the magnet between the closed and the open position is controllable by a magnetic field from the at least one coil.

8 Claims, 14 Drawing Sheets

(56) References Cited

U.S. PATENT DOCUMENTS

| | | |
|---|---|---|
| 7,438,858 B2 | 10/2008 | Shvets et al. |
| 8,690,744 B2 | 4/2014 | Harms et al. |
| 8,948,898 B2 | 2/2015 | Barkmann et al. |
| 2002/0069785 A1 | 6/2002 | Knapp |
| 2008/0043059 A1 | 2/2008 | Okazawa et al. |
| 2015/0014558 A1* | 1/2015 | Lanigan .............. F16K 31/0606 251/129.09 |

FOREIGN PATENT DOCUMENTS

| | | |
|---|---|---|
| DE | 102007029064 A1 | 12/2008 |
| DE | 102009029821 A1 | 12/2010 |
| EP | 1099484 A1 | 5/2001 |
| GB | 2262152 A | 6/1993 |
| WO | WO-2009146766 A1 | 12/2009 |
| WO | WO-2015120956 A2 | 8/2015 |

OTHER PUBLICATIONS

Written Opinion of the International Searching Authority issued by the European Patent Office acting as the International Searching Authority in relation to International Application No. PCT/NO2017/050086 dated Sep. 19, 2017 (5 pages).

Notification of Transmittal of International Preliminary Report on Patentability issued by the Nordic Patent Institute acting as the International Preliminary Examining Authority in relation to International Application No. PCT/NO2017/050086 dated Jul. 10, 2018 (5 pages).

Norwegian Search Report issued by the Norwegian Patent Office in relation Norwegian Application No. 20160612 dated Nov. 7, 2016 (2 pages).

European Office Action dated Sep. 3, 2020, issued in corresponding European Patent Application No. 17730958, 4 pages.

* cited by examiner

VALVE NOZZLE AND VALVE NOZZLE ASSEMBLY

CROSS-REFERENCE TO RELATED APPLICATIONS

This application is a national phase entry under 35 U.S.C. 371 of PCT International Application No. PCT/NO2017/050086 filed Apr. 7, 2017, which claims priority to Norwegian Patent Application No. 20160612, filed Apr. 13, 2016, the disclosure of each of these applications is expressly incorporated herein by reference in their entirety.

INTRODUCTION

The present invention concerns a valve nozzle assembly, a valve nozzle, and uses thereof.

BACKGROUND OF THE INVENTION

A variety of precision valves and valve nozzles exists for many different application areas. Examples include e.g. precision valve nozzles for hydraulic applications, solenoid valves for aerospace and fuel systems, drop-on-demand precision nozzles for inkjet printers.

Today's existing precision valve nozzles are complex and expensive and also requires mounting in manifolds. This requires use of a number of seals to achieve a fluid tight construction, as well as manual mounting of the valve within the manifold. There is a need for a simple and cost efficient design for valves, also allowing for upscaling.

SUMMARY OF THE INVENTION

The invention solves or at least alleviates the problems as outlined above.

In an aspect the invention provides a valve nozzle assembly comprising a number of valve nozzles arranged in a predetermined pattern.

Each valve nozzle in the valve nozzle assembly may comprise at least one coil and a magnet adapted to be movable between a closed position closing the nozzle and an open position opening the nozzle, wherein a movement of the magnet between the closed and the open position is controllable by a magnetic field from the at least one coil. Each valve nozzle may further comprise a guiding device for the magnet, so wherein the guiding device is adapted for guiding the magnet between the closed and the open position. The guiding device may be provided with at least one opening adapted for inflow of fluid into the valve nozzle when the magnet is in the open position.

The valve nozzle assembly may further comprise a tray with a fluid chamber. The magnet and the guiding device may be arranged in the tray.

The at least one coil may be integrated in at least one printed circuit board mounted above and/or below the tray. The at least one coil may further comprise an upper coil and a lower coil, wherein the upper coil is integrated in an upper printed circuit board and the lower coil is integrated in a lower printed circuit board, wherein the tray is mounted between the upper plate and the lower plate.

An inlet for fluid into the fluid chamber of the tray may be provided in the upper printed circuit board or in a wall of the tray. The fluid may after inflow through the at least one opening exit the valve through a nozzle opening.

The valve nozzle may further comprise a securing element adapted to move the magnet towards the closed position and secure the magnet in the closed position, when the magnetic field from the at least one coil is turned off. The at least one coil may be integrated into a printed circuit board. The at least one coil may be arranged above the magnet or below the magnet. The at least one coil may be constituted by a first coil arranged above the magnet and a second coil arranged below the magnet. The magnet may be a permanent magnet. The valve nozzle may have a modular design. A nozzle part of the valve nozzle may also be exchangeable.

The valve nozzle assembly may have a modular design.

In a further aspect the invention provides a valve nozzle comprising at least one coil and a magnet adapted to be movable between a closed position closing the nozzle and an open position opening the nozzle, wherein a movement of the magnet between the closed and the open position is controllable by a magnetic field from the at least one coil.

The valve nozzle may further comprise a guiding device for the magnet, wherein the guiding device is adapted for guiding the magnet between the closed and the open position. The guiding device may be provided with at least one opening adapted for inflow of fluid into the valve when the magnet is in the open position. The fluid may after inflow through the at least one opening exit the valve through a nozzle opening.

The valve nozzle may further comprise a securing element adapted to move the magnet towards the closed position and secure the magnet in the closed position, when the magnetic field from the at least one coil is turned off. The at least one coil may be integrated into a printed circuit board. The at least one coil may be arranged above the magnet or below the magnet. The at least one coil may be constituted by a first coil arranged above the magnet and a second coil arranged below the magnet. The magnet may be a permanent magnet. The valve nozzle may have a modular design. A nozzle part of the valve nozzle may also be exchangeable.

The valve nozzle assembly and the valve nozzle may be used for precision spraying of plant treatment liquids. The plant treatment liquids may e.g. be pesticides, fertilizers or herbicides.

The valve nozzle assembly and the valve nozzle are both simple in design with only one movable part (the magnet). Only one movable part also ensures a secure and reliable valve nozzle when in use. The different elements, both the valve nozzle assembly and each of the valve nozzles are easily assembled together. Production as integrated elements allow for efficient production at considerable reduced costs. The number of valve nozzles in a valve nozzle assembly are easily scalable.

BRIEF DESCRIPTION OF THE DRAWINGS

Example embodiments of the invention will now be described with reference to the followings drawings, where.

DETAILED DESCRIPTION OF THE EMBODIMENTS

The present invention will be described with reference to the drawings. The same reference numerals are used for the same or similar features in all the drawings and throughout the description.

Figure 1A:
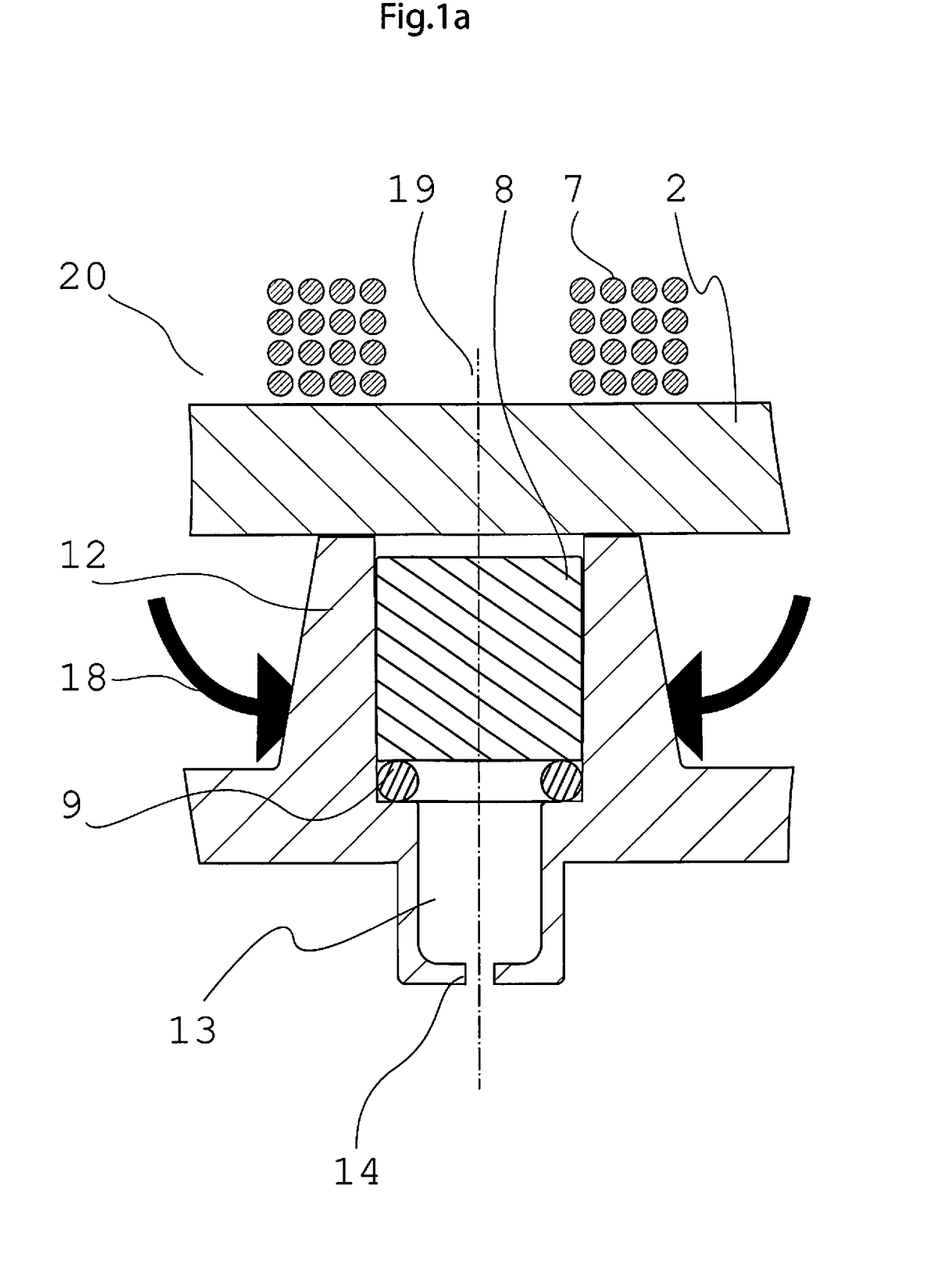
FIG. 1a shows a schematic cross-sectional view of a valve nozzle with an upper coil according to an example embodiment of the present invention. The valve is in a closed position.

FIG. 1a shows a valve nozzle 20 with a coil 7 and magnet 8. The valve is shown in a closed position 18 for a fluid flow (arrows). In the closed position no fluid is allowed to flow into the valve. In the closed position the magnet 8 is in a lower position as shown in FIG. 1a. The magnet 8 is movable between the closed position 18 closing the valve nozzle and an open position 17 (FIG. 1c, upper position) opening the valve nozzle. The movement of the magnet between the closed 18 and the open 17 position is controllable by a magnetic field from the coil 7. The magnet 8 may be precisely controlled by the coil to assume a number of positions between open and closed. The magnet 8 acts as a closing mechanism for the valve.

In FIG. 1a the coil 7 is arranged above the magnet 8. A valve block top part 2 is arranged above the magnet and the coil 7 is provided on top of the valve block top part 2.

Figure 1B:
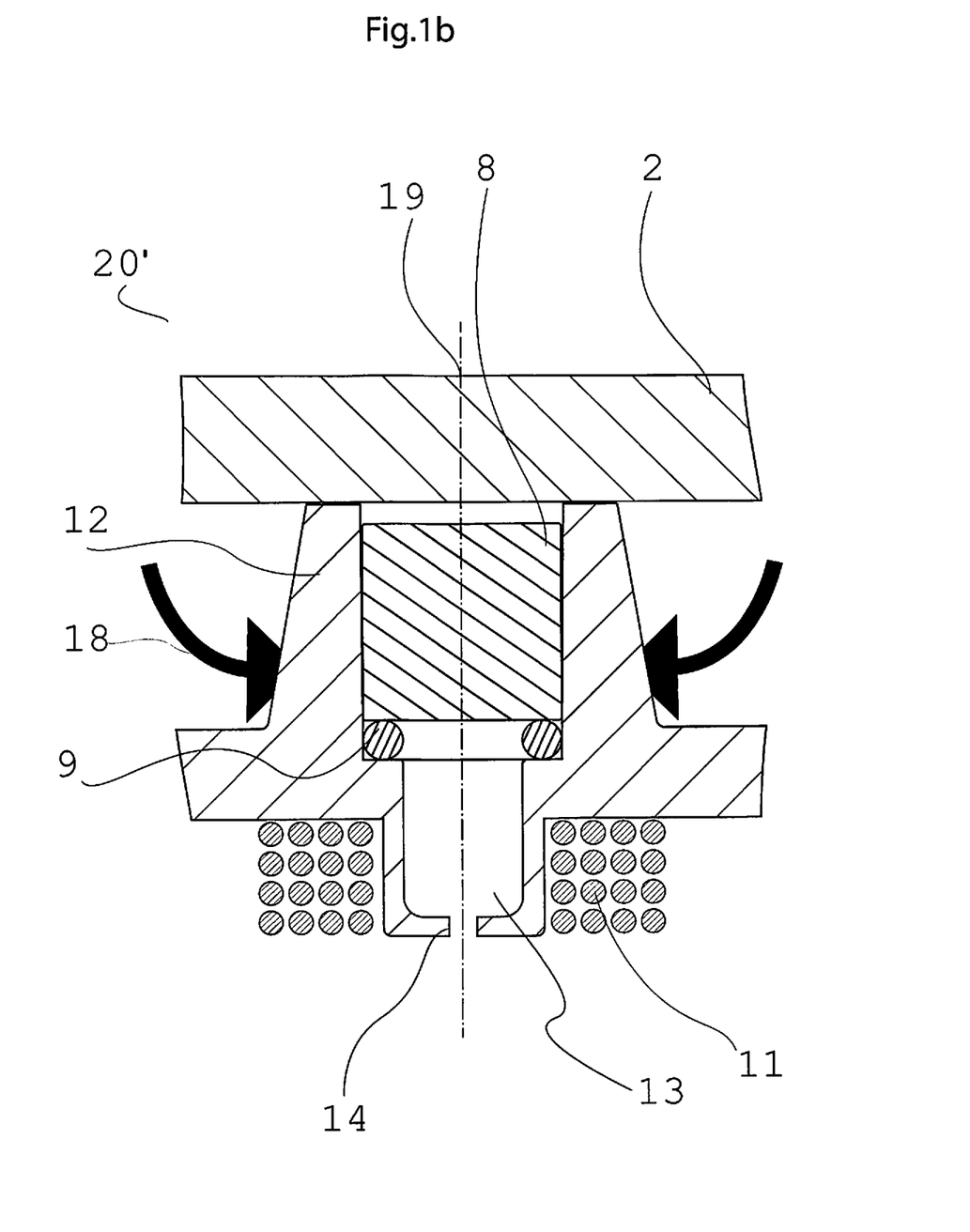
FIG. 1b shows a schematic cross-sectional view of a valve nozzle with a lower coil according to a further example embodiment of the present invention. The valve is in a closed position.

In FIG. 1b, an alternative embodiment is shown where the coil 11 is arranged below the magnet 8. The coil 11 is provided under a valve block lower part 3.

The movement of the magnet 8 is controlled by a coil 7, 11. The magnet 8 acts as a closing mechanism for the valve. A sealing element 9 is provided on the valve block lower part 3 facing the magnet 8 to ensure sealing of the valve in the closed position. The sealing element 9 may e.g. be in the form of an O-ring. The magnet 8 is moved between the closed position and the open position by a magnetic field provided by the coil 7, 11. The magnetic field is controlled by controlling the current in the coil 7, 11. (Electric power source not shown in the figures.) Opening and closing may be provided by reversing the magnetic field. When using more than one coil, the coils may be independently controlled.

There is no need for e.g. a spring in order to close the valve nozzle 20 and keep the valve nozzle 20 closed. This means that fewer parts are needed and that the entire assembly, as well as the production process itself, would be easier and cheaper.

The magnet is provided inside a guiding device 12. The guiding device 12 is adapted for guiding the magnet 8 between the closed 18 and the open 17 position. The inner shape of the guiding device 12 and the outer shape of the magnet 8 is adapted to each other in order to provide a close fit allowing a smooth and controlled movement of the magnet 8 without friction inside the guiding device, but still allowing for a tight interaction enabling closing of the valve for a fluid flow. The guiding device 12 may be made of non-magnetic material, such as e.g. plastic. The guiding device may be implemented in a number of embodiments, e.g. as a predefined pattern of elongated upstanding elements, predefined pattern of tower like structures, a ring shape a number of rings, and other shapes.

Figure 1C:
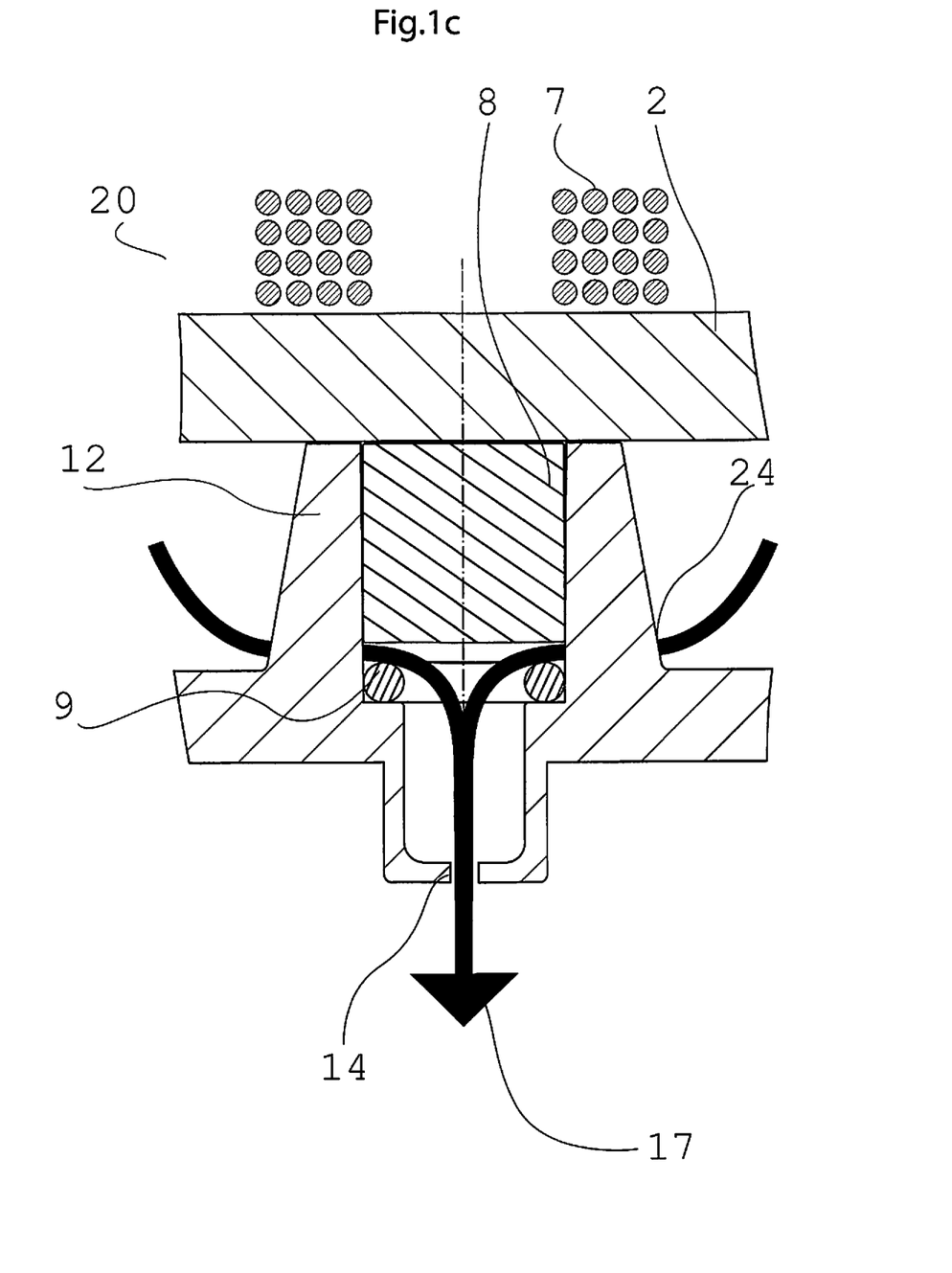
FIG. 1c shows a schematic cross-sectional view of a valve nozzle with an upper coil according to an example embodiment of the present invention. The valve is in an open position.

The guiding device is provided with at least one opening 24 for the inflow of fluid into the valve. The inflow of fluid through such openings 24 is illustrated in FIG. 1c by the flow 17 (large arrow). When the magnet is in the open position, which in FIG. 1c is an upper position of the magnet, the inflow openings of the guiding device 12 are open. When the magnet is in the closed position, which in FIG. 1a or 1b is a lower position of the magnet, the inflow openings of the guiding device 12 are closed by the magnet 8. In the embodiment in FIG. 1c the guiding device is provided with four openings in a radial direction. The openings may have a number of configurations; e.g. in the form of a hole or a plurality of holes in the guiding device, the guiding device may be provided with slots in the longitudinal direction, or the guiding device may also be in the form of a number of rings with holes. The fluid flows in the direction of the arrow 17, into the valve through the openings, then into a fluid holding chamber 13 and exits out of a nozzle opening 14 in a lower nozzle part.

The fluid holding chamber 13 is provided in a middle nozzle block 3 below the magnet 8. The fluid holding chamber is provided with the nozzle opening 14. The fluid holding chamber 13 ensures a smooth fluid flow exiting the nozzle opening 14 and enables generation of repeatable droplets with the same direction and speed. Controllable droplets results in an improved precision of the fluid exiting the opening, and thus enhanced precision spraying.

Figure 2A:
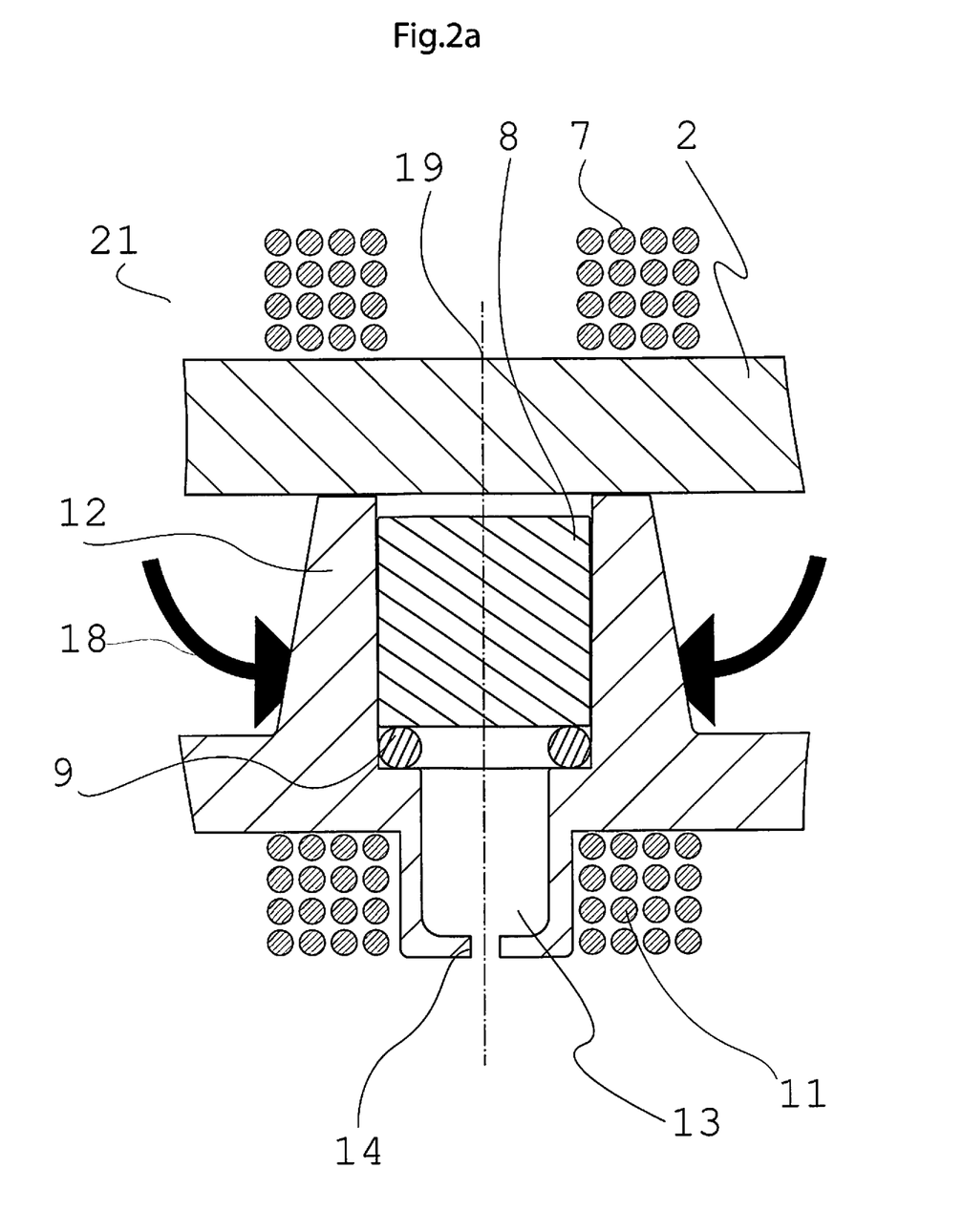
FIG. 2a shows a schematic cross-sectional view of a valve nozzle with an upper coil and a lower coil according to an even further example embodiment of the present invention. The valve is in a closed position.
Figure 2B:
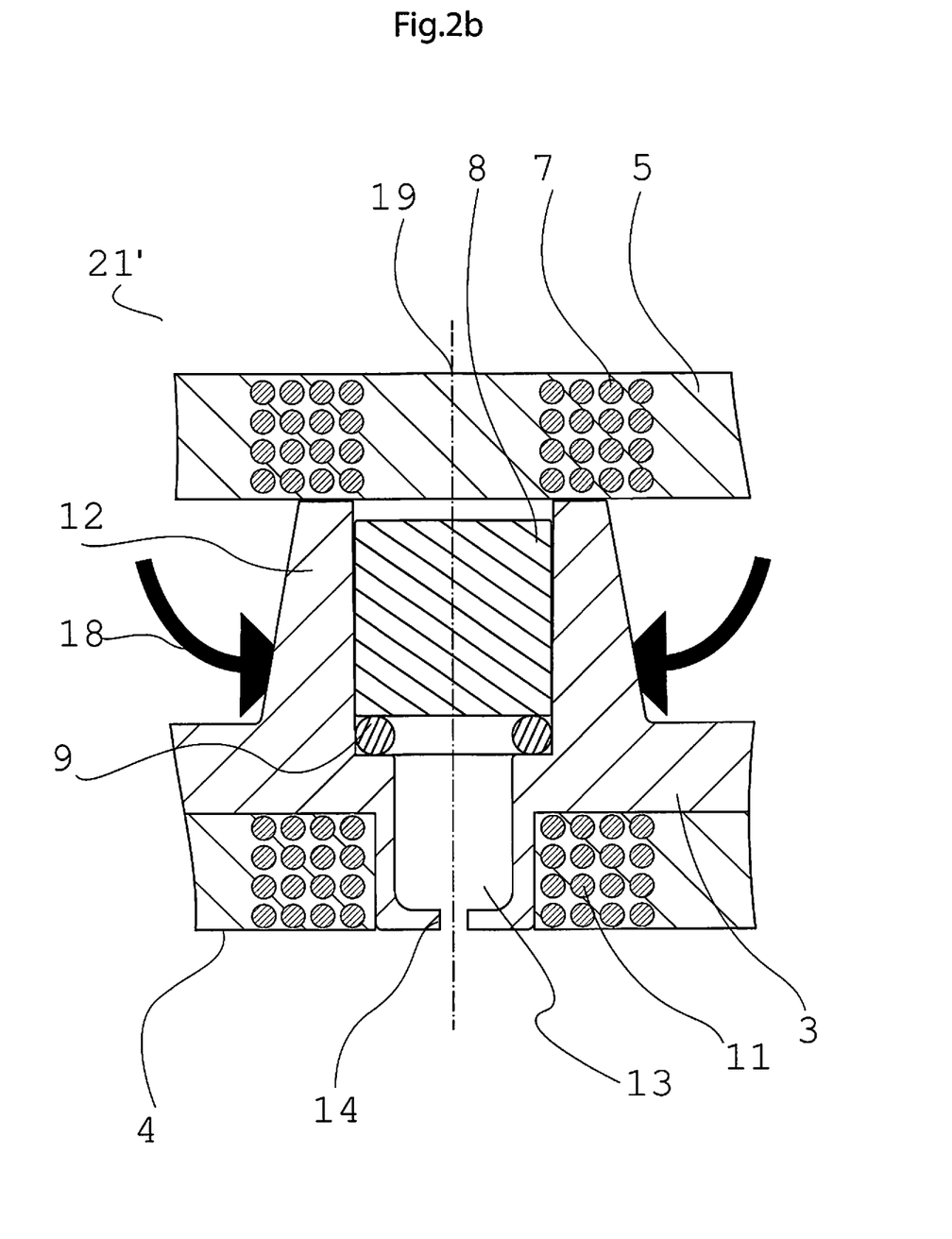
FIG. 2b shows a schematic cross-sectional view of a valve nozzle with an upper coil and a lower coil integrated in a printed circuit board according to an even further example embodiment of the present invention. The valve is in a closed position.

The nozzle 14 may be an integrated part of the valve together forming a nozzle valve 20, or a removable nozzle part that may be mounted and dismounted from the valve part. The guiding device 12, together with the valve block lower part 3 may form one integrated part constituting a housing for the magnet 8. The nozzle opening 14 may be provided at a distance from the housing. FIG. 2e shows an embodiment with an extension element 10 providing between the chamber 13 and an exchangeable nozzle part 23. Use of an extension element enables a more flexible construction with increased freedom in arrangement of the nozzle part in relation to the valve part. The nozzle may be made of e.g. plastic, steel, sapphire or any other suitable material.

The nozzle opening 14 may be adapted to the area of use of the valve nozzle. The speed and amount of the outflow of fluid exiting the nozzle opening 14 depends on the pressure in the supplied fluid, the actual design of the openings and the position of the magnet 8. The fluid 17, 18 may exit the nozzle opening 14 as a precision fluid jet stream or droplets. Small droplets may be achieved by fast movement of the magnet. The fluid may not be pressurized and allowed to flow out of the opening 14 as drops when the valve is in the open position.

Figure 1D:
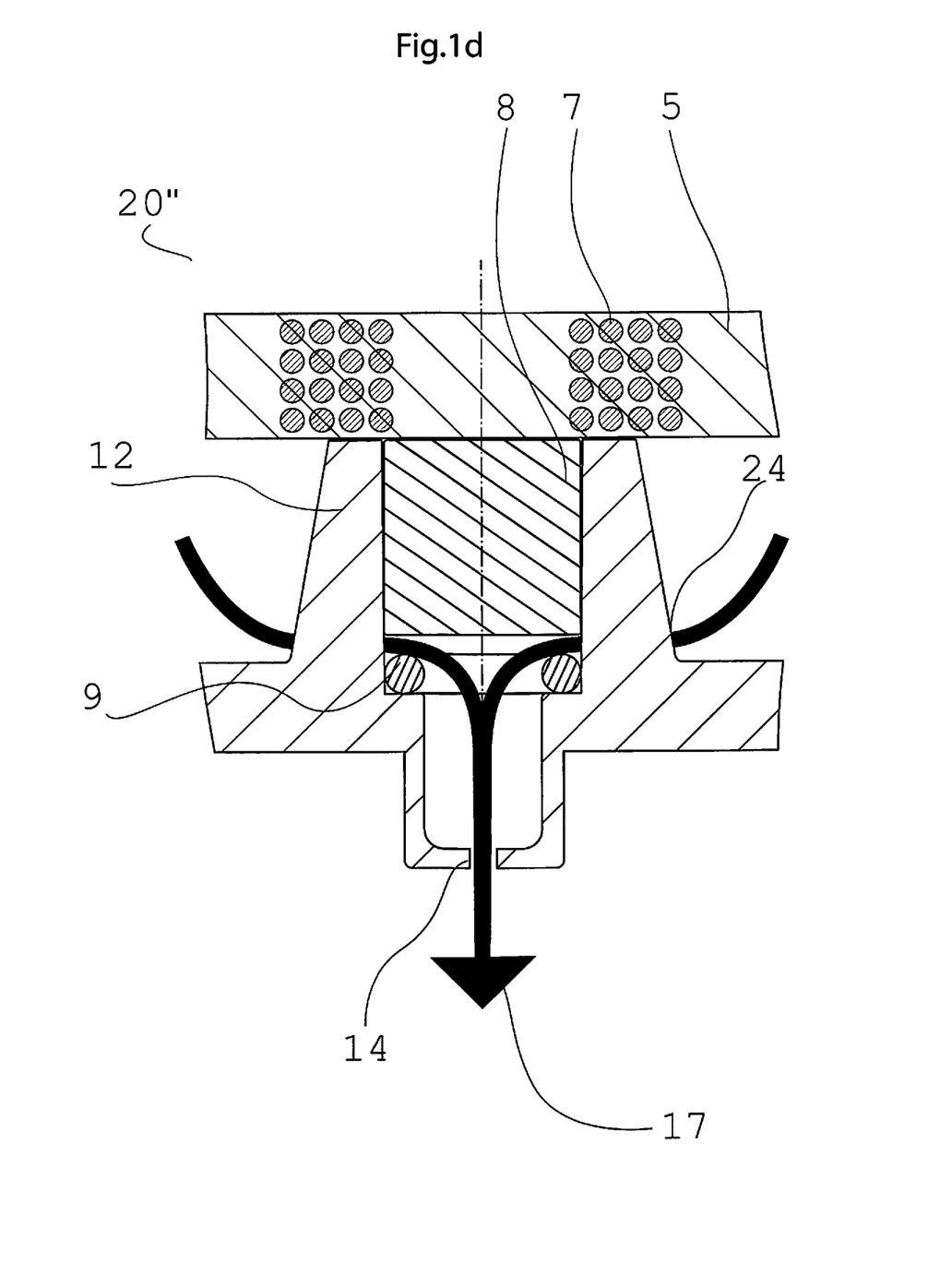
FIG. 1d shows a schematic cross-sectional view of a valve nozzle with an upper coil integrated in a printed circuit board according to an example embodiment of the present invention. The valve is in an open position.

FIG. 1b is an alternative embodiment of the valve nozzle in FIG. 1a where the only difference is that the coil 11 is arranged below the magnet 8. The coil 11 is provided under a valve block lower part 3. The main operating principle of the valve nozzle 20, 20', 20", 21, 21' is the same independent on the arrangement of the coils and the number of coils used. FIG. 1d is an alternative embodiment of the valve nozzle in FIG. 1a, where the upper coil is embedded in a printed circuit board 5. The valve is shown in an open position.

The elements of the valve and nozzle 20, 20', 20", 21, 21', coil(s) 7,11, valve block upper part 2, valve block lower part 3, guiding device 12 and nozzle 14, are in FIG. 1a-1d arranged symmetrically about a longitudinal axis 19 through the center part of the valve. The magnet 8 is in the embodiments shown in all the Figures for simplicity of illustration only showed in the form of a rod, where the center of the rod defining the longitudinal axis 19. Other shapes may also be envisaged, e.g rod with hemispheres at the ends, hemispherical shapes, gradated in one of the ends, a sphere or a mixture of these shapes or any other shape. The magnet 8 may be a permanent magnet. The magnet is movable along the longitudinal axis 19. The center of the nozzle opening 14 also coincide with the longitudinal axis.

Further embodiments of the valve described above are shown in FIGS. 2a-2d. In FIG. 2a, the nozzle valve is provided with two coils; an upper coil 7 and a lower coil 11. The nozzle valve is shown in a closed position. In FIG. 2b, the two coils 7, 11 are embedded in printed circuit boards 5, 4. This improves the modular design of the nozzle valve and simplifies the construction. This reduces costs and enables a flexible design, which easily may be produced in various dimensions for different areas of use, as well as enables valve nozzle assemblies comprising a plurality of valve nozzles.

The coils 7, 11, or the integrated circuit boards, may be connected in series or in parallel and can be controlled as one unit. The coils may be flat. Each printed circuit board 5, 4 may be layered. A number of coil windings may be provided in each layer. For example, a printed circuit board may have 12-layers, whereas the coils 7, 11 may have eight (-8-) windings per layer. The number of layers and windings can vary depending on the required magnetic field for control of the magnet. The size of the magnet may vary depending on the dimensions of the valve and the area of use. The coils 7, 11 may be made of e.g. cobber or silver.

Figure 2C:
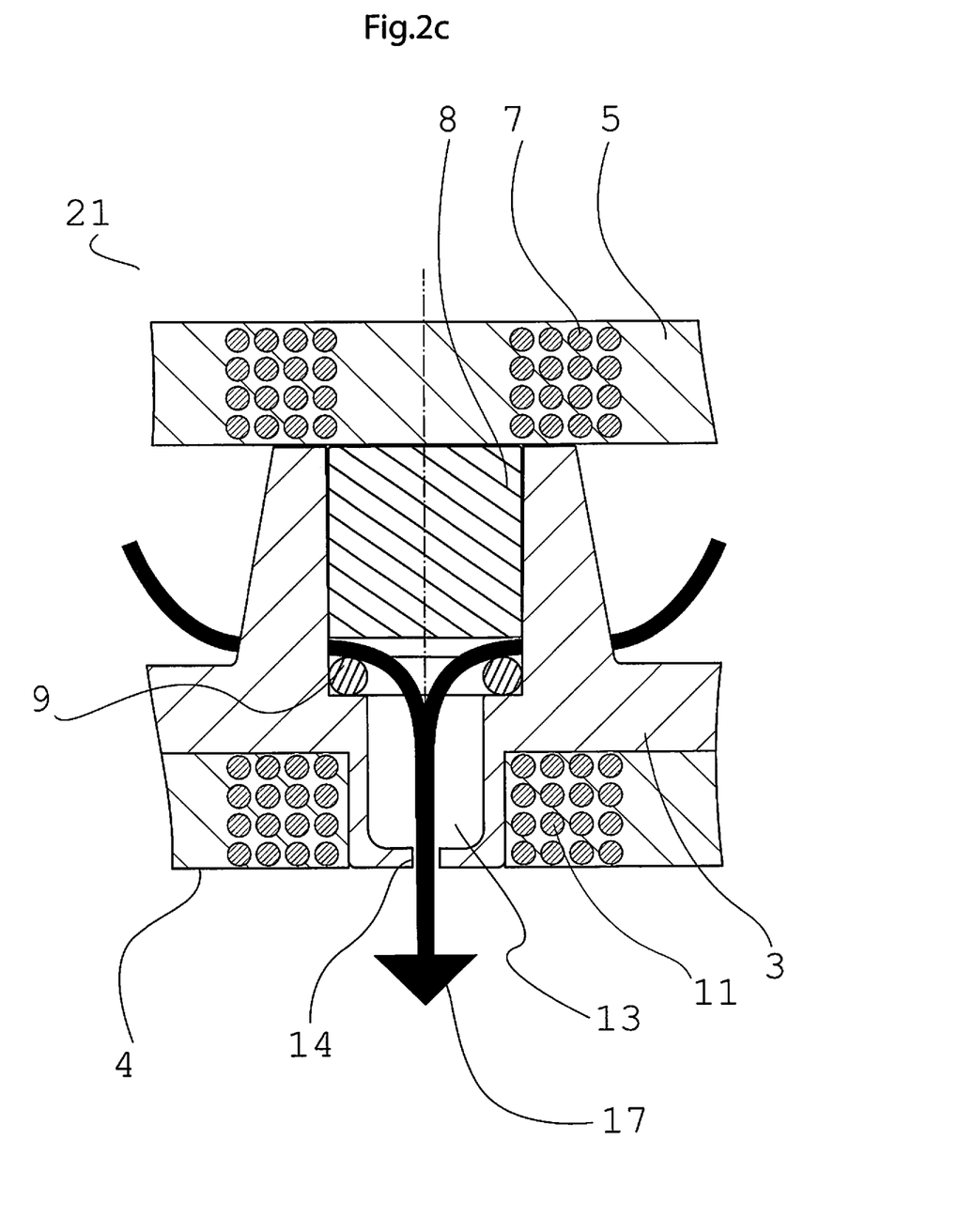
FIG. 2c shows the valve from FIG. 2b in an open position.
Figure 2D:
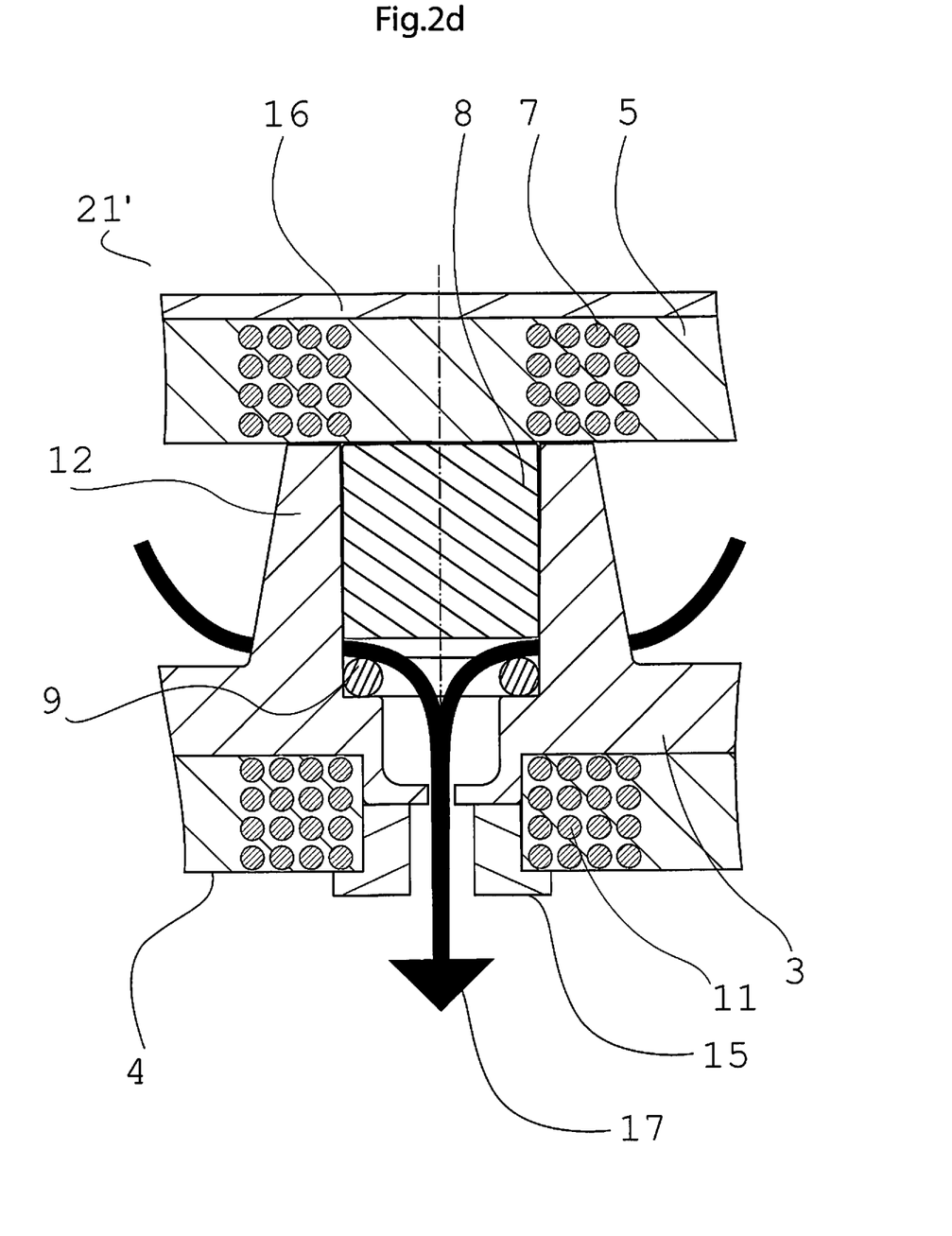
FIG. 2d shows the valve from FIG. 2c provided with a securing device for securing the valve in a closed position according to an even further example embodiment of the present invention.
Figure 2E:
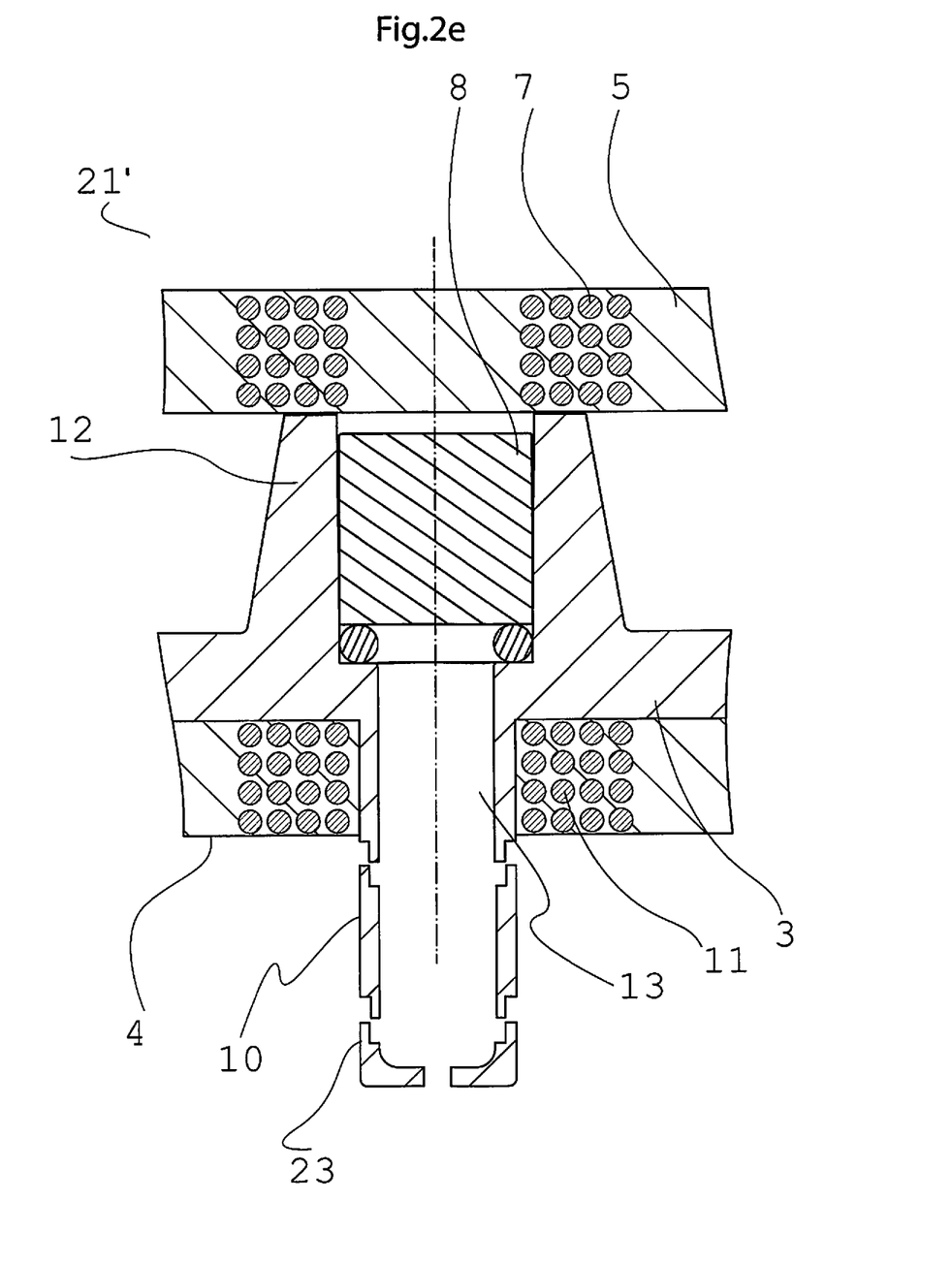
FIG. 2e shows the valve from FIG. 2b provided with a removable nozzle and an extension element according to further example embodiment of the present invention.

FIG. 2d shows an embodiment of the valve from FIG. 2c provided with a securing element 15 for securing the magnet 8 in a closed position. The securing element moves the magnet 8 towards the closed position and secures the magnet in this position. When the current in the coils 7, 11 are turned off, the securing element 15 ensures the magnet stays in the closed position securely closing the valve. The securing element 15 may be a flange, ring or collar. The securing element 15 in FIG. 2d is arranged below the nozzle opening. In this embodiment, the securing element 15 attracts the magnet 8 toward the closed position and secure the magnet in the closed position by magnetic attraction forces. Other embodiments may be envisaged. In an embodiment where a number of valve nozzles are grouped together, as e.g. in the valve nozzle assembly shown in FIG. 4a, the securing elements 15 for the valve nozzles may be made as one part, e.g. in the form of a plate with ridges having one ridge assigned to each valve nozzle. In FIG. 2d the securing element 15 is arranged below the nozzle opening 14. The securing element has a diameter larger than the diameter of the nozzle opening to not disturb the exit flow. The securing element can be made of a magnetic material, e.g. steel.

The securing element may also function to concentrate the magnetic field lines of the coil 11 increasing the magnetic field strength and thus the force acting on the magnet. This improves the efficiency and performance of the nozzle. Further, a top element 16 can be arranged above the upper coil 7. The top element 16 can be made of magnetic material, e.g. steel. The top element 16 may thus also direct the magnetic field lines towards the magnet 8, increasing the magnetic field strength and thus improve the control of the magnet, increasing the efficiency and performance of the valve and valve nozzle.

FIG. 2e shows the valve nozzle from FIG. 2b with a removable nozzle 23. The nozzle 23 may thus be easily replaced when damaged, and also replaced by a different nozzle adapted to the actual use of the valve nozzle assembly. An extension element 10 is also shown in FIG. 2e arranging the nozzle part 23 a distance away from the valve. This results in a more flexible solution as described earlier above. The extension element may be in the form of e.g. a tube or a hose.

Figure 3:
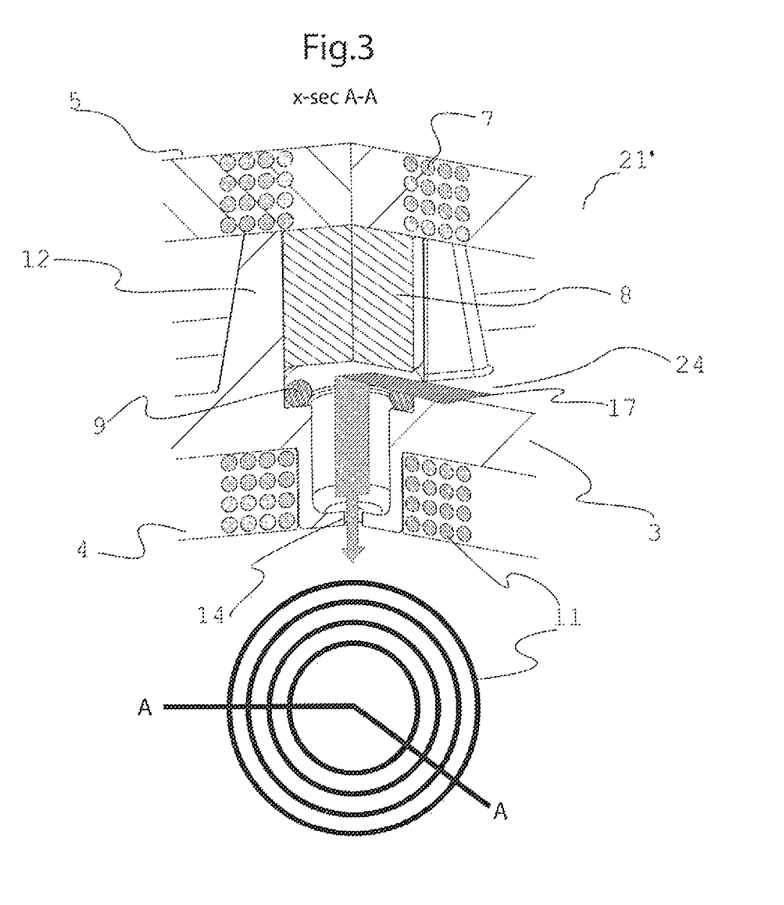
FIG. 3 shows a schematic sectional view along section A-A of the valve nozzle in FIG. 2c.

FIG. 3 shows a schematic sectional view along section A-A of the valve in the embodiment in FIG. 2c. The sectional view shows the circular cross-sectional shape of the magnet 8, a seal (e.g. an O-ring or other gasket) 9, the fluid holding chamber 13 and the nozzle opening 14. FIG. 3 shows the flow (in the direction of the arrow 17) of fluid through the valve and out of the nozzle opening 14. The fluid flows into the valve nozzle through the openings 24 in the guiding element 12, or in or in-between the guiding elements depending on the shape of the guiding elements. The fluid entering the valve above the seal (e.g. an O-ring or other gasket) and below the magnet 8, flowing downwards through the fluid holding chamber 13 and exiting the opening 14.

Figure 4A:
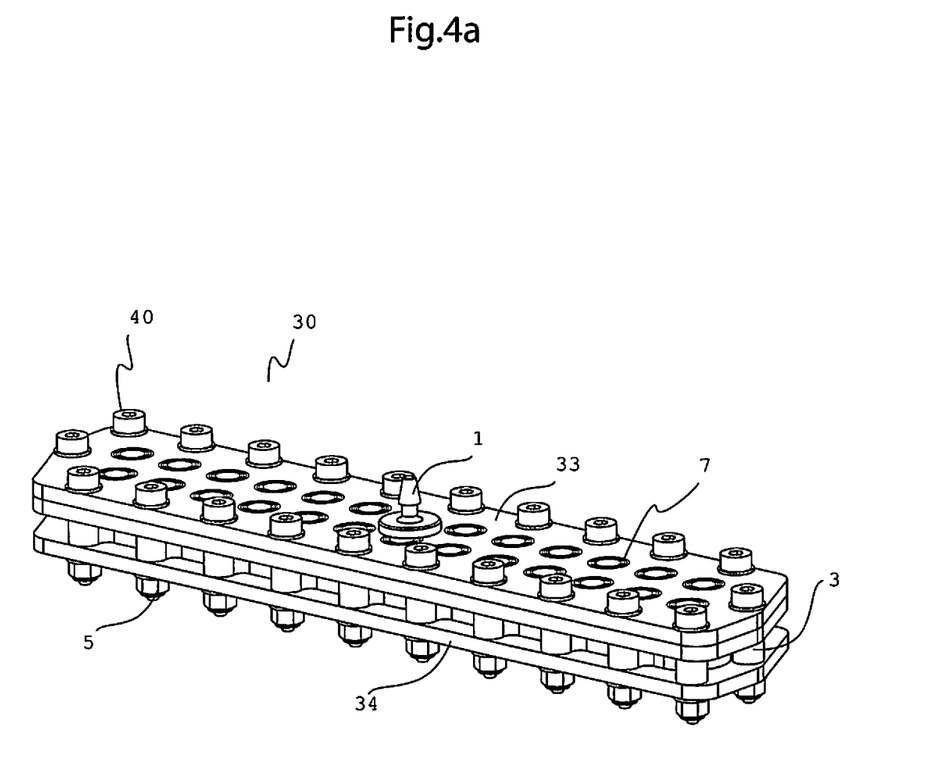
FIGS. 4a and 4b shows schematic illustrations of a valve nozzle assembly including a plurality of the valves from FIG. 2b and FIG. 2c according to an example embodiment of the present invention.
Figure 4B:
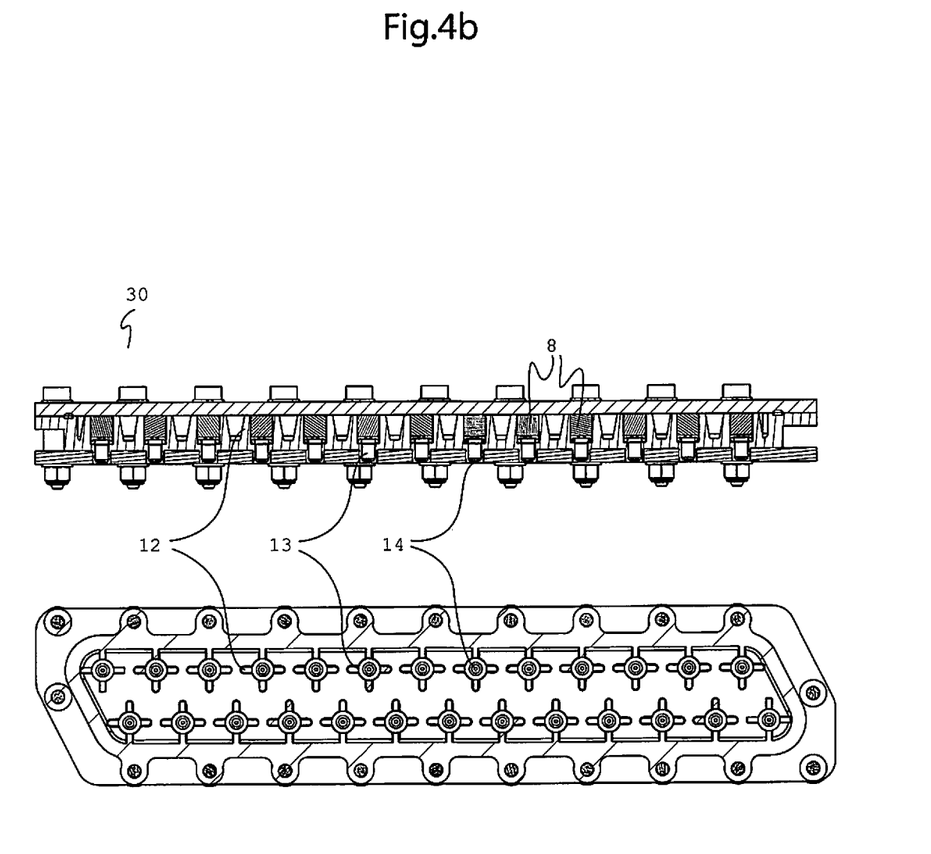

FIG. 4a-4b shows schematic illustrations of a valve nozzle assembly 30 including a plurality of the valve nozzles 20 from FIG. 2b and FIG. 2c. FIG. 4a shows the valve nozzle assembly in assembled form. An inlet 1 for fluid is provided on top of the valve nozzle assembly 30. The valve nozzles 20 are arranged in a predetermined pattern. The valve nozzles are arranged in two rows in FIG. 4a-b. The arrangement of the valve nozzles should provide enough space for the coils 7, 11 on the upper plate 33 and lower plate 34 avoiding influence on neighbouring magnets 8. The upper plate and the lower plate may be printed circuit boards 33, 34. The circular pattern on the top printed circuit board 33 are the upper coils 7. The circular pattern thus shows the positioning of the valve nozzles 20 in the assembly. FIG. 4b upper drawing shows the valve nozzle assembly 30 in side view showing the positioning of the guiding devices 12 and the fluid holding chambers 13 with the nozzle openings 14. FIG. 4b lower drawing shows the valve nozzle assembly 30 from the underside with guiding devices 12, fluid holding chambers 13 and nozzle openings 14. The circular pattern around the nozzle openings are the lower coils 11 embedded in the lower circuit board 34. The guiding devices 12 are seen as four elongated upstanding elements enclosing each magnet.

Figure 6:
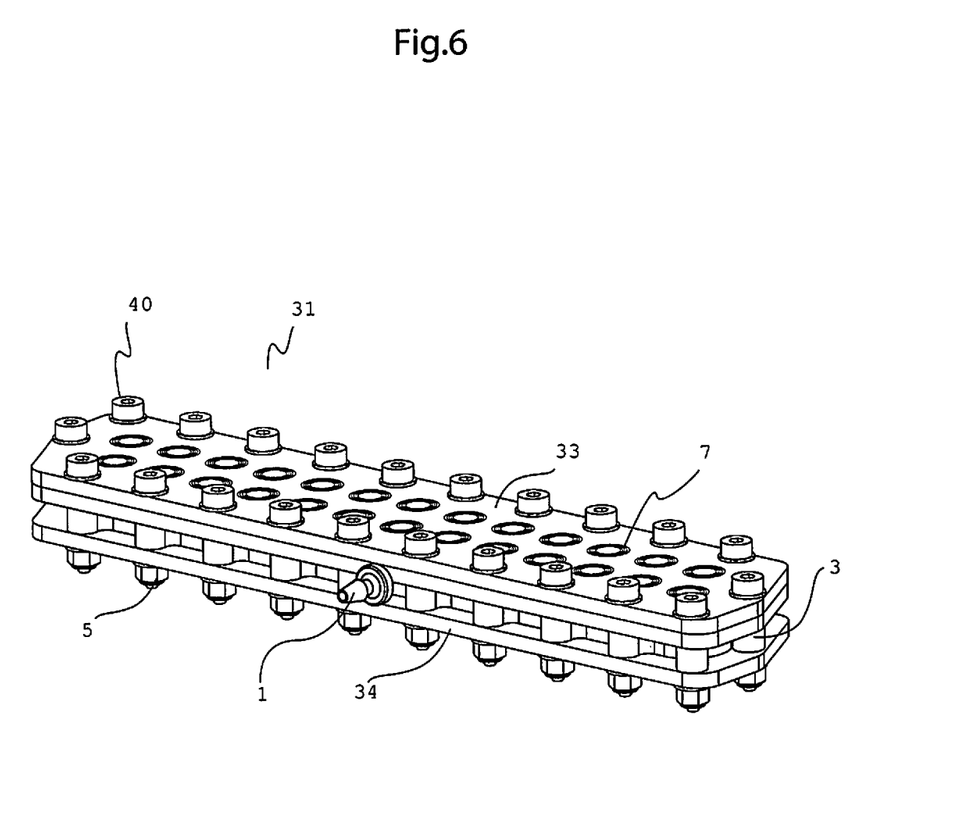
FIG. 6 shows a further embodiment of the valve nozzle assembly according to the present invention.

FIG. 6 shows an alternative embodiment of the vale nozzle assembly of FIG. 4a where the only difference is that an inlet for fluid is provided in the tray 31.

Figure 5:
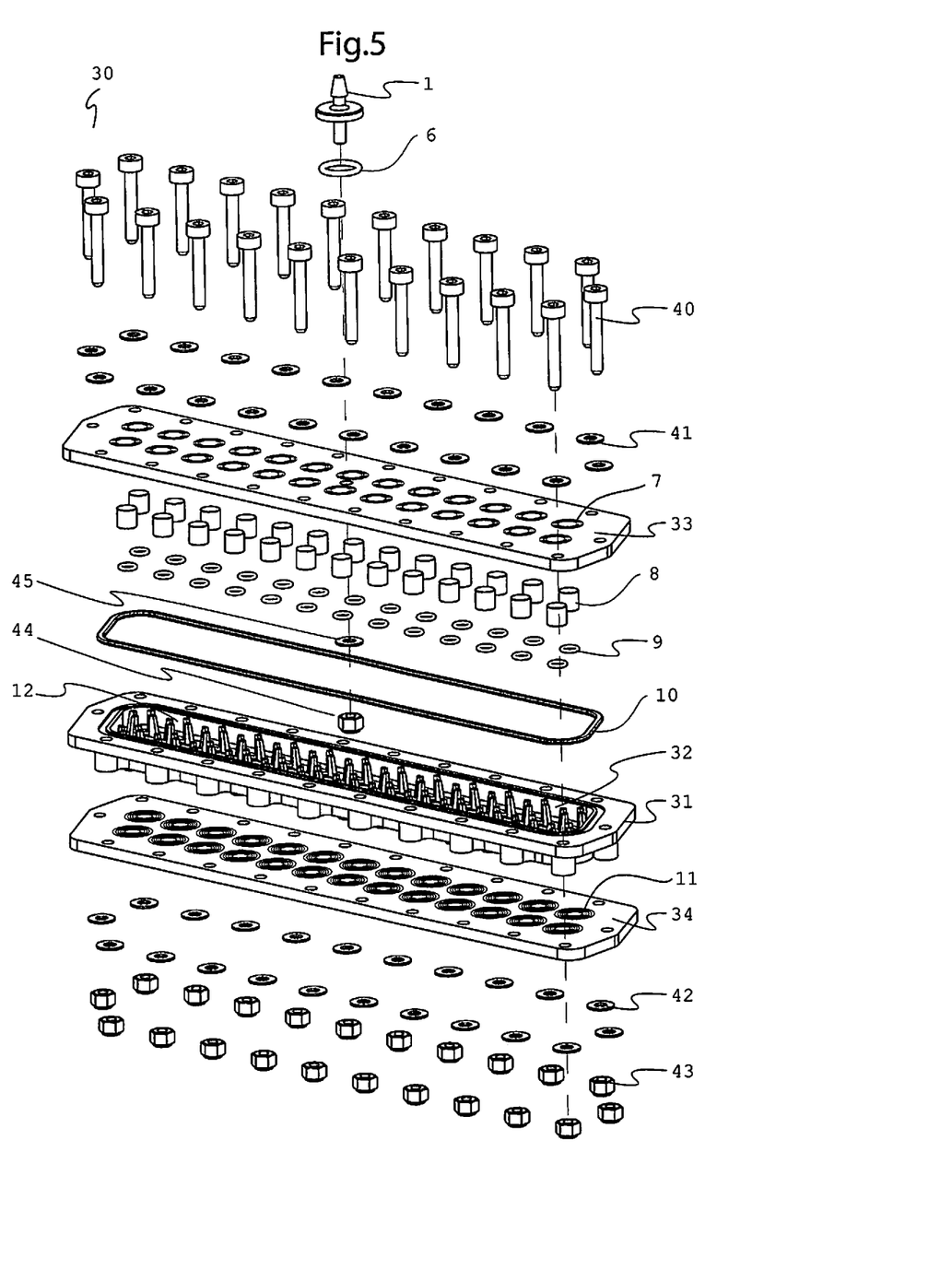
FIG. 5 shows the valve nozzle assembly from FIG. 4a-4b in a schematic exploded view.

FIG. 5 shows the valve nozzle assembly from FIG. 4a-4b in a schematic exploded view. The valve nozzle assembly comprising a tray 31 with a fluid chamber 32. The upper printed circuit board 33 with embedded coils 7 are mounted together with the magnets 8 and seals (shown as O-rings) 9 to a middle tray/container 31. The tray/container 31 is provided with the upstanding structures 35 functioning as the guiding elements 12. A magnet is arranged inside each guiding element 12 with an O-ring 9 underneath. The upper printed circuit board 33, a sealing element 10 for the tray 31, and the tray are fastened together by the use of the fluid inlet 1 secured by a nut 44 and washer 45. The assembly is fastened securely together including the lower circuit board 4 by use of bolts 40 and nuts 43 and washers 41,42. Alternatively, other fastening methods like, but not limited to, e.g. clamps, glue, or clips may be used for fastening the elements together.

The tray 31 also functions as a fluid container 32 supplying fluid to the valve nozzles through the openings in the guiding structures 12 in the assembly. The guiding elements 12 with openings are arranged inside the fluid container 32. Each valve nozzle in the assembly may be independently controlled. When a selected valve is instructed to enter into an open position, the openings in the guiding elements 12 allows fluid from the fluid container 32 to flow into the valve and exit the nozzle opening 14 as explained above. The inside of the valve nozzle assembly may be pressurized providing a pressured fluid jet or droplets exiting the nozzle openings 14.

The tray 31 with guiding elements 12 may be produced as a single part by moulding or casting. The tray and guiding elements may also be produced separately and then mounted together, by e.g. a snap-on configuration where the parts are pressed together, or fixed by e.g. glue.

The simple design of the valve nozzle allows for cost-effective production of valve nozzles in various sizes and adapted to different areas of use. The simple modular design of the valve nozzle assembly and production of the tray with guiding devices as one part, considerable reduces the number of parts and production costs. Both upscaling and downscaling of the valve nozzles and number of valve nozzles in each assembly may easily be provided.

The valve nozzle and valve nozzle assembly may be used for precision spraying of plant treatment liquids, such as e.g. pesticide, herbicides or fertilizers. The valve nozzle and valve nozzle assembly may be used in medical applications, or in ink jet printers (also called large character valve-jets) for production lines for e.g. cartoons, pipes or other large objects.

In a non-limiting example embodiment the nozzle valve may form drops in the order of 1 microliter. The size of the magnet may then be about 3 mm and the nozzle opening about 0.7 mm. A commonly used production size of printed circuit boards have a length of 500 mm and a width of 500 mm. It is then possible to arrange about 750 nozzle valves on the printed circuit board forming the nozzle valve assembly. Other example embodiments may also be envisaged with both smaller nozzle valves and considerably larger nozzle valves than in the example embodiment above. Also larger or smaller printed circuit boards than about 500 mm may be produced. The size of the printed circuit board may be adapted to the use of the valve nozzle assembly and shooting area to be covered. A longer printed circuit board enables droplet shooting on larger areas.

Having described preferred embodiments of the invention it will be apparent to those skilled in the art that other embodiments incorporating the concepts may be used. These and other examples of the invention illustrated above are intended by way of example only and the actual scope of the invention is to be determined from the following claims.

The invention claimed is:

1. A valve nozzle assembly comprising:
a tray with a fluid chamber; and
a number of valve nozzles arranged in a predetermined pattern, wherein each of the valve nozzles includes:
at least one coil, wherein the at least one coil:
is integrated in at least one printed circuit board mounted above or below the tray; or
includes at least one upper coil and at least one lower coil, wherein the at least one upper coil is integrated in at least one printed circuit board mounted above the tray and the at least one lower coil is integrated in another at least one printed circuit board mounted below the tray;
at least one valve nozzle inlet arranged in the fluid chamber;
a nozzle opening adapted for fluid outflow from the valve nozzle, the nozzle opening being located outside the fluid chamber;
a magnet adapted to be movable between a closed position closing the valve nozzle and an open position opening the valve nozzle, wherein a movement of the magnet between the closed and the open position is controllable by a magnetic field from the at least one coil; and
a guiding device for the magnet arranged in the fluid chamber, wherein the guiding device is adapted for guiding the magnet between the closed and open position, and wherein the guiding device is provided with the at least one valve nozzle inlet, the at least one valve nozzle inlet being adapted for inflow of fluid into the valve nozzle when the magnet is in the open position.

2. The valve nozzle assembly according to claim 1, wherein the magnet is arranged in the tray.

3. The valve nozzle assembly according to claim 1, wherein each of the valve nozzles further includes a securing element adapted to move the magnet towards the closed position and secure the magnet in the closed position, when the magnetic field from the at least one coil is turned off.

4. The valve nozzle assembly according to claim 1, wherein the valve nozzle assembly is configured for precision spraying of plant treatment fluids (e.g. pesticides, fertilizers or herbicides), or in medical applications or in ink jet printers.

5. The valve nozzle assembly according to claim 1, wherein the at least one coil is configured to control the movement of the magnet from both the closed to the open position and from the open to the closed position.

6. The valve nozzle assembly according to claim 1, wherein the nozzle opening is adapted for outflow of the fluid from the valve nozzle when the magnet is in the open position.

7. The valve nozzle assembly according to claim 1, wherein an inlet for fluid into the fluid chamber of the tray is provided in the upper printed circuit board.

8. The valve nozzle assembly according to claim 1, further comprising an inlet for fluid into the fluid chamber of the tray.

* * * * *